(No Model.) 2 Sheets—Sheet 2.

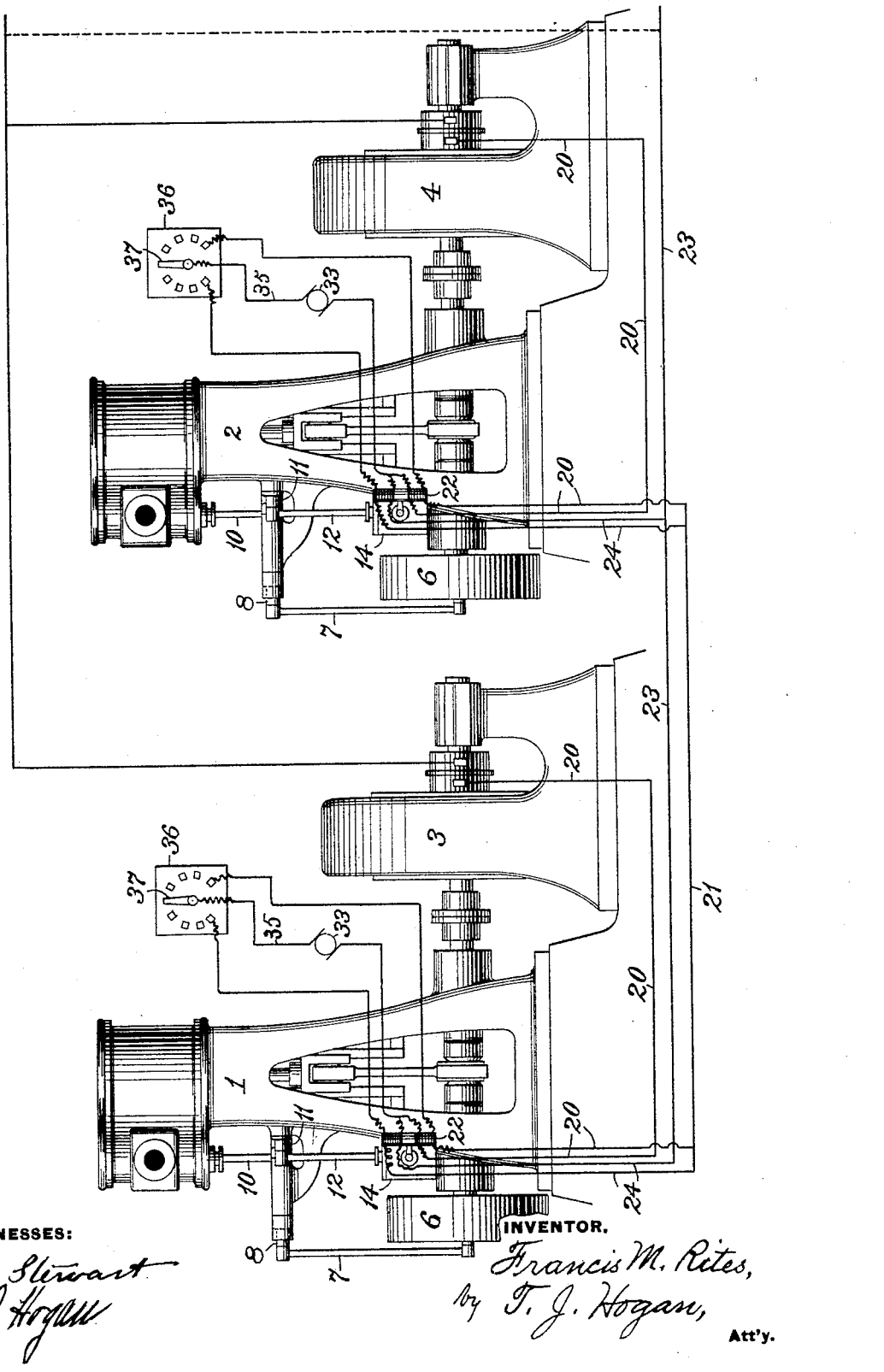

F. M. RITES.
GOVERNING DEVICE FOR FLUID PRESSURE MOTORS.

No. 582,233. Patented May 11, 1897.

WITNESSES:
G. W. Stewart
E. D. Hogan

INVENTOR.
Francis M. Rites,
by T. J. Hogan,
Att'y.

UNITED STATES PATENT OFFICE.

FRANCIS M. RITES, OF ITHACA, NEW YORK.

GOVERNING DEVICE FOR FLUID-PRESSURE MOTORS.

SPECIFICATION forming part of Letters Patent No. 582,233, dated May 11, 1897.

Application filed January 13, 1897. Serial No. 619,042. (No model.)

*To all whom it may concern:*

Be it known that I, FRANCIS M. RITES, a citizen of the United States, residing at Ithaca, in the county of Tompkins and State of New York, have invented or discovered a certain new and useful Improvement in Governing Devices for Fluid-Pressure Motors, of which improvement the following is a specification.

The object of my invention is to utilize to a greater extent than has been possible heretofore the available forces which may be employed for controlling the speed of fluid-pressure motors, to neutralize or counteract the effects of other detrimental forces, and to turn to useful effect certain forces which heretofore have not been considered as available for the purposes of regulation.

To this end my invention consists in improved means for electrically controlling motors employed in driving electrical generators, both automatically and by manually-operated devices; in means for utilizing the influence of the reactive forces of reciprocating parts on the speed of fluid-pressure motors, whereby variations in the speed may be effected by changing the balance of such forces; in electrical means whereby such change of balance may be effected automatically or otherwise; in the combination of such means with a mechanical governing device, and in certain combinations and features of construction, all as hereinafter set forth.

Figure 3:
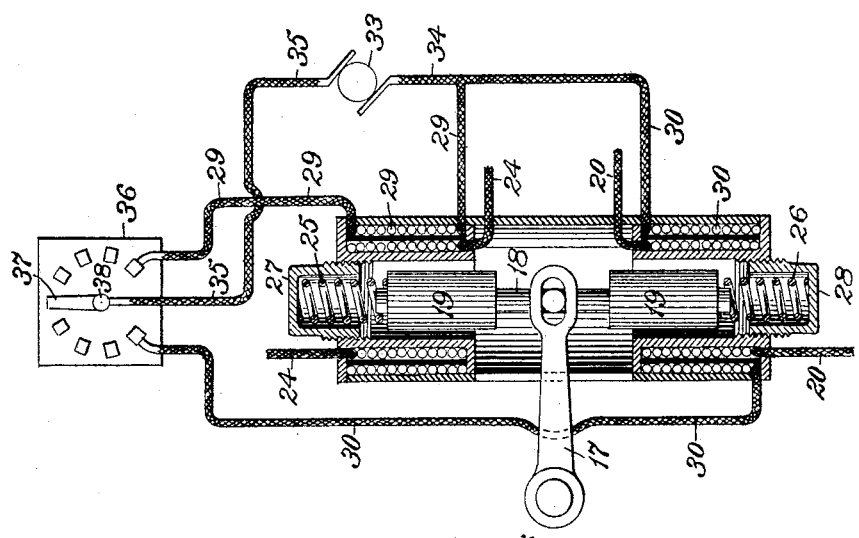
Figure 2:
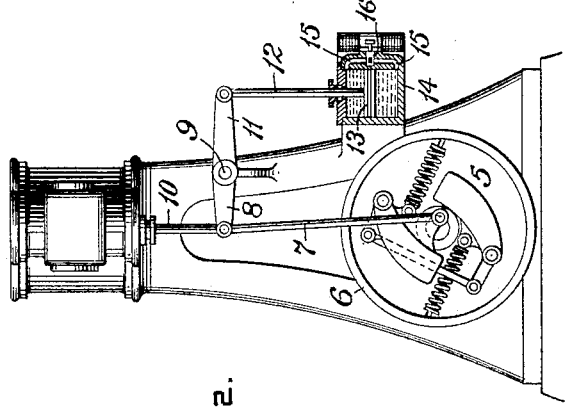

In the accompanying drawings, which illustrate an application of my invention, Figure 1 is a side elevation showing two fluid-pressure motors provided with my improvement and coupled to two electric generators which are connected with the same main circuit; Fig. 2, a view of one of the motors at right angles to the view shown in Fig. 1, the cylinder of the speeder being shown in section; Fig. 3, a section through a compound solenoid adapted to be connected with and to operate the valve of the speeder, and Fig. 4 a modification showing another form of solenoid.

In the practical application of my invention, as shown in the drawings, I employ, in combination with the shaft-governor and valve-gear of the fluid-pressure motor, a device which has been termed a "speeder," the effect of which is to partly or wholly balance, as desired, the forces, such as inertia and friction, which tend to modify the operation of the shaft-governor, and in combination with the speeder I employ means whereby the speeder may be adjusted automatically or by hand, or both. I have shown means whereby the adjustment of the speeder may be effected automatically or at the will of the engineer or person in charge by means of an electric current, but my improvement is not limited to this particular application.

In an application of my invention such as that shown in the drawings, where two or more generators of electricity, each driven by a separate motor, are connected with and feed into the same main circuit, my improvement provides means whereby any variation in the output of any of the generators from that of the others or from a desired standard may automatically effect a suitable variation in the adjustment of the governing mechanism of the motor and the output of the generators be restored to the proper normal equality. The combination of electrical devices with the speeder, by which my improvement is adapted to equalize the loads of the units which may be connected to and which feed into the same main circuit, is herein referred to as an "electric balance."

In the accompanying drawings I have shown two steam-engines 1 and 2 coupled to and operating two generators 3 and 4, which are connected with and feed into the same main circuit.

Each coupled or connected motor and generator may be referred to as a "unit," and while I have shown but two such units I wish it to be understood that any greater number may be employed and that my improvement is applicable to any number or to a single unit or to such a combination as includes but one motor and one generator, and the different units may be of different types. The principal advantages of my improvement are obtained in a system in which a number of units are employed.

Each of the motors 1 and 2 is provided with a governor 5, which is mounted on the flywheel 6 and connected by means of a rod 7 with an arm 8 on a rock-shaft 9, the rock-shaft 9 being provided with another arm, to which the valve-stem 10 is connected, but which is not shown because it is back of and in line with the arm 8. An arm 11 is secured to the rock-shaft 9 and connected at its outer end with a rod 12, on one end of which is secured a piston 13, working in a cylinder 14. The ends of the cylinder 14 are closed, but may be put in communication with one another through a passage 15, which is controlled by a valve 16. By means of an arm 17 on its stem the valve 16 may be moved to open or close the passage 15.

The cylinder 14 may be filled with some elastic fluid, preferably air, and when the valve 16 is in position to close the passage 15 and to prevent the passage of air from one end of the cylinder to the other the air will be alternately compressed and expanded in the opposite ends of the cylinder as the piston reciprocates. The alternate resistance and assistance which the air offers to the movement of the piston will tend to counterbalance the inertia and modify the effects of friction of the reciprocating parts of the valve-gear with which it is connected, and the governor will be adjusted to modify the cut-off and the supply of motor fluid and thereby to modify the speed of the motor.

The effect of the inertia and friction of the reciprocating parts of the valve-gear on the adjustment of the governor, if those forces are unbalanced, is a tendency to shift or adjust the governing mechanism so as to cause an increase in the length of the cut-off of the motive fluid, and the alternate compression and expansion of the air in the opposite ends of the cylinder 14 and the corresponding resistance and assistance to the reciprocating motion of the piston 13 by counterbalancing the inertia of the reciprocating parts tends to prevent an increase in the length of cut-off and in the quantity of motive fluid admitted to the engine-cylinder. If, however, the valve 16 be moved so as to partially or wholly open the passage 15, so as to put the two ends of the cylinder 14 in communication, the alternate compression and expansion of the air in the cylinder 14 will be decreased or prevented, the alternate resistance and assistance offered to the movement of the piston 13 will also be correspondingly decreased or altogether removed, and the effects of inertia and friction of the reciprocating parts being thus unbalanced will tend to shift or adjust the governor to a position corresponding to a longer cut-off and an increase in the quantity of motive fluid admitted to the cylinder of the engine. A reverse operation of the valve 16, by which the communication between the opposite ends of the cylinder is partially or wholly closed by partially or wholly counterbalancing the inertia of the reciprocating parts, tends to decrease the length of the cut-off and the quantity of fluid admitted to the engine-cylinder.

The combination of the cylinder 14, its piston 13, connected to the valve-gear of the motor, and the valve 16, however it may be operated, constitute an adjustable balance and supplemental controlling device of such a nature that it operates to balance or modify disturbing forces generally which tend to cause irregularity of action in the valve-gear and governing mechanism. This automatically-adjustable balance or supplemental controlling device, by means of which the effects of inertia of the reciprocating parts and other disturbing forces may be varied, adjusted, or counterbalanced, forms an important feature of my invention, and, whether operated automatically or otherwise, forms a means whereby the most delicate adjustment of the cut-off may be effected in accordance with the variations in the load and while the engine is in motion. As employed in practice this portion of my improvement is referred to as a "speeder."

The controlling-valve 16 of the speeder may be operated or adjusted by hand or by other means, such as an electromagnet or solenoid, as shown in the drawings, and the action of those devices on the valve may be either automatic or at the will of the engineer or attendant in charge of the plant.

As shown in the drawings, my improvement is adapted to effect, by means of electrical devices, regulation and control of motors connected to and driving generators of electricity which are connected with the same main circuit, the effect of my improvement being to equalize the load on the different units, the adjustment of the cut-off of the motors being influenced by the variations in the output of the generators. The arm 17 on the stem of the valve 16 engages with a stem 18, secured to the core 19 of a solenoid, through the coil or coils of which an electric current may be passed to actuate the core and move the valve 16 into any desired position of adjustment.

Figure 4:
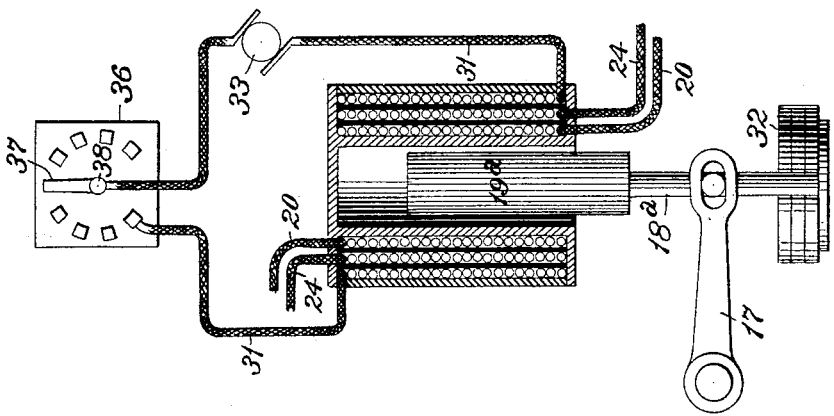

In Figs. 3 and 4 are shown two forms of solenoids, either of which may be employed, but, if preferred, other forms of solenoids or electromagnetic devices may be employed.

In the construction shown in Figs. 1, 2, and 3 the current from each of the generators passes through a conductor 20 to a main conductor 21, and in so doing passes through one coil of the solenoid 22, by which the valve 16 is operated. The main conductor or distributer or bus-wire 21 receives the current from all of the generators and is connected with the main circuit or feeder 23. From the conductor 21 the current passes to the conductor 23 through the wires 24, around each of the solenoids 22, in such a manner as to oppose the action of the current passing around the solenoids through the wires 20, and so long as the action of these two opposing currents is balanced the valve 16 will be unmoved and no variation in the adjustment of the speeder or in the action of inertia on the governing device will be effected.

If from any cause the load on one unit becomes too small or too large, the opposing influences of the two currents, around the magnet or solenoid which operates the controlling-valve of the speeder of that unit, will be varied by the change of conditions so as to cause movement of the core 19 of the solenoid, and, with it, movement of the arm 17 and valve 16, and the passage 15 connecting the ends of the cylinder of the speeder will be opened or closed, or its capacity varied, in accordance with the requirements. In case the load on or output of any particular unit be too small the adjustment of the speeder will be such as to cause a longer cut-off of the motor fluid and a corresponding increase in the load assumed by that particular unit. If the load on any particular unit be too great, an opposite adjustment of the speeder will be effected, the valve-gear of the motor forming part of that unit will be adjusted to a shorter cut-off, and the load will be reduced.

Some one unit may act as the guiding-unit, and all of the other units will then automatically be adjusted to conform therewith.

Referring to Fig. 3, it will be seen that the core 19 of the solenoid is held in position between two springs 25 and 26, which are adjustable by means of the screw-caps 27 and 28. The current through the lower inner coil, which coil is in circuit with the wire 20, leading from the generator to the distributing-bar, tends to move the core 19 and the arm 17 downward, and thereby to close the valve 16. The current through the upper inner coil, which is in the circuit of the wire 24, leading from the distributing-bar to the main line, tends to move the core 19 and arm 17 upward, and thereby to open the valve 16. In each of the units this return-circuit from the distributing-bar to the main line is carefully calibrated to a predetermined resistance, which in units of uniform size should be equal, so that the current from the distributing-bar around the magnets or solenoids should be uniform and its action the same on each of the cores. The number of turns in the two coils need not be exactly the same, as the weight of the core or resistance of one or the other of the springs may require some difference in the coils for the purpose of balancing these resistances.

The outer upper and lower coils formed by the wires 29 and 30, as shown in Fig. 3, may be connected in separate circuits, and the current therethrough may be varied as desired from the switchboard by means of a series of resistances, which may be thrown into or out of the circuit at will. The connections are such that the current through the upper outer coil of wire 29 opposes the action of the current through the upper inner coil, which is in circuit with the wire 24, and the current through the lower outer coil—that is, through the coil of wire 30—opposes the action of the current through the lower inner coil, which is in circuit with the wire 20. The connections may, however, be such that the direction of the current or currents through either or both of these outer coils may be reversed, so that they assist instead of opposing the action of the currents through the adjacent coils. These outer coils form a means of adjustment by hand from the switchboard, which may be operated at any time while the plant is in operation and which is specially useful in adjusting each of the units when getting up to speed before the unit is connected with the other units already in operation.

In Fig. 3 the upper and lower coils are connected at one end with the resistance-box 36 and at the other end with the wire 34, forming part of the circuit of and connected with one pole of a generator 33. The other pole of the generator 33 is connected by a wire 35 with an arm or circuit-closer 37, which is adapted to be moved about the pivot 38 to the right or left to vary the resistance through the coils.

In Fig. 4 I have shown a construction in which the inner coil, which is in the circuit of the wire 20, is surrounded by a coil in the circuit of the wire 24, the current through the inner coil tending to raise the core $19^a$ against the resistance of the weights 32 on the stem $18^a$ and the current through the second coil in the circuit of the wire 24 tending to oppose that in the inner coil. These coils should be so arranged that when the unit to which they belong is doing its share of the work the opposing currents will be so proportioned that they will support the core $19^a$ and the weights 32, and with them the arm 17, in the proper position to produce the desired effect on the inertia-speeder and on the cut-off of the motor fluid of the engine. With this arrangement, if we suppose any disturbance of the balance to occur or that any one of the units is operating under less than its share of the total load, then, while the current through the second coil of that unit is substantially unchanged in strength, the current through the inner coil will be less than it should be, the preponderance of the effect of the current through the inner coil on the core $19^a$ will be lessened, and the weights and core will move downward and carry with them the arm 17, and by this movement of the arm 17 the valve 16 of the inertia-speeder will be moved to open or enlarge the passage between the ends of the cylinder 14, the governing device will move to a position of longer cut-off, and the load on the unit will be increased.

The outer coil shown in Fig. 4 may be connected by the wire 31 with a circuit and with a switch controlling a series of resistances, which may be thrown into or cut out of the circuit, and the influence of the current through this outermost coil may be employed for the purpose of effecting adjustments by hand from the switchboard either while running or in preparing to connect an additional unit with a multiple system.

In Fig. 4 the wire 31 of the outer coil of the solenoid has its opposite ends connected with a resistance-box 36 and with an arm or circuit-closer 37, and a generator 33, in circuit with the coil, supplies current thereto.

While the outer coils of the solenoids are shown connected with independent generators, they may be connected with the main circuit of the generators driven by the fluid-pressure motors or with a shunt therefrom, or an induced current may pass through these coils or through any of the other coils, and the other coils may also be connected with the main circuit by a shunt.

The fluid-pressure device referred to as a speeder, with its adjustable valve for controlling the resistance to the movement of the piston 13, is applicable to fluid-pressure motors generally, whether it is adjusted by hand or automatically, but its employment in combination with motors for operating electrical generators is specially advantageous, and the electrical balance—that is, the combination, with a governor and the speeder, of electrical means for automatically effecting adjustment of the speeder or of means whereby the speeder is adjusted in accordance with the current or output of the generators—constitutes the most perfect and delicate means of regulation that has ever been employed, so far as I am aware.

While in the embodiment of my invention shown in the drawings the electric balance is referred to as including the speeder and governor or as comprising the combination of the electric devices with the speeder and governor, it may be more generally described as comprising the combination, with controlling devices for two or more fluid-pressure motors, of means by which the controlling devices may be adjusted or the supply of the motive fluid controlled or regulated by the differential action of currents of electricity from individual generators and from a main conductor or distributer. The speeder may or may not be employed, and it is not essential that a shaft-governor or a shifting eccentric should be employed. Any construction in which the speed-controller of two or more motors is adjusted by the action of currents from two or more generators feeding into the same circuit will come within the broad definition of an electric balance as herein regarded as being of my invention; and it is immaterial whether the motors are electric motors, steam-engines, or water-wheels, or whether the controlling devices are shaft-governors, throttling-governors, electric speed-controllers, or Corliss governors, or if one unit of the combination has a shaft-governor and another a throttling-governor, or if one unit has a Corliss cut-off and another has a water-wheel governor. It is immaterial how many and varied the motors and governors may be so long as they are controlled by the electric balance in such a way that the load is automatically divided in some special and predetermined relation between the several units.

In the embodiment of my invention shown in the drawings the action of divided currents from the main conductor, distributer, or bus-bar opposes the action of the individual currents from the single generator, and the differential effects of these opposing efforts upon the speed of the motor causes a redivision of the current tending to equalization in case there should be any tendency to an unequal division on account of the different regulation of the governing elements of the motors.

The electric devices need not be connected exactly as shown, as the electric currents may be employed in a variety of ways to effect the desired purpose. For example, the electric devices may be connected in series, so that the current from the main distributer may pass in succession around the different solenoids.

It will be seen that by means of my improvement the cut-off of the motive fluid may be controlled not only automatically under the action of the electric current without adjustment of the governor by the action of the centrifugal force, but by any means adapted to vary the resistance of the balancing device or speeder, either directly or indirectly, or automatically or non-automatically, or at the will of the operator, engineer, or attendant. The valve-controlled fluid-pressure device by which these results may be obtained is a special feature of my improvement, whether the adjustment of the valve be effected by hand, by the action of an electric device or other hand-controlled means, or automatically; but my improvement is not limited to a fluid-pressure device, since any form of balance may be employed where the adjustment is effected by the automatic or other action of electrical devices or where the adjustment is automatically effected by any means.

I claim as my invention and desire to secure by Letters Patent—

1. The combination, with a fluid-pressure motor, of a governor, and means independent of the governor, and connected with the valve-gear of the motor, which is adapted to automatically adjust the governor, substantially as set forth.

2. The combination, with a fluid-pressure motor, of a governor, a reciprocating pressure device connected with a reciprocating member of the valve-gear of the motor and adapted to modify the effects of the inertia and friction tending to disturb the action of the governor, and means whereby the action of the pressure device may be automatically varied to effect variations in the supply of the motive fluid, substantially as set forth.

3. The combination, with a fluid-pressure motor, of a governor, an elastic pressure device connected with the valve-gear of the motor and tending to modify the effects of the inertia of reciprocating parts and other disturbing forces, and means for automatically adjusting the pressure device, substantially as set forth.

4. The combination, with a fluid-pressure motor, of a governor, an elastic pressure device connected with the valve-gear of the motor and adapted to modify the effects of the inertia of reciprocating parts and other disturbing forces, and electrically-operated means for automatically adjusting the pressure device, substantially as set forth.

5. The combination, with a fluid-pressure motor, of a governor, an elastic fluid-pressure device connected with the valve-gear of the motor and adapted to modify the effects of the inertia of reciprocating parts and other disturbing forces, and means for automatically adjusting the pressure device, substantially as set forth.

6. The combination, with a fluid-pressure motor, of a governor, a cylinder filled with air or other elastic fluid, a piston in the cylinder which is connected with the valve-gear of the motor, and means for controlling the pressures in the opposite ends of the cylinder, substantially as set forth.

7. The combination, with a fluid-pressure motor, of a governor, a cylinder filled with air or other elastic fluid, a piston in the cylinder which is connected with the valve-gear of the motor, and a valve controlling communication between the spaces on the opposite sides of the piston, substantially as set forth.

8. The combination, with a fluid-pressure motor, of a governor, a cylinder filled with air or other elastic fluid, a piston in the cylinder, which is connected with the valve-gear of the motor and which is adapted by its movement to compress the fluid in the cylinder, and a valve which is adapted to automatically vary the degree of compression of the fluid, substantially as set forth.

9. The combination, with a fluid-pressure motor, of a governor, an elastic fluid-pressure device connected with the valve-gear of the motor, and an electrically-operated valve controlling the action of the fluid-pressure device, substantially as set forth.

10. The combination, with two or more fluid-pressure motors, of a governor for each of the motors, and means whereby the governor of each of the motors may be automatically adjusted in accordance with the relative load on that motor, substantially as set forth.

11. The combination, with two or more fluid-pressure motors, and electrical generators driven thereby, of a governor for each of the motors, and means whereby the governor of each of the motors may be automatically adjusted in accordance with the relative output of the generator driven by that motor, as compared with that of the other generators, substantially as set forth.

12. The combination, with two or more fluid-pressure motors, and electrical generators driven thereby and feeding into the same circuit, of governing devices for each of the motors, and means whereby each unit is controlled and regulated in accordance with variations of its output from that of the other units, or from a standard, substantially as set forth.

13. The combination, with two or more fluid-pressure motors, and electrical generators driven thereby and feeding into the same circuit, of a governor for each of the motors which is adapted to independently control the motor to which it is applied and means whereby any variation in the load of that motor from that of the other motors or from a standard, may effect an adjustment of the governor tending to equalize the loads, substantially as set forth.

14. The combination, with a fluid-pressure motor, of a governor, a pressure device for modifying the effects of inertia and other disturbing forces of the valve-gear, and means whereby the pressure device may be adjusted by the action of electricity, substantially as set forth.

15. The combination, with a fluid-pressure motor, of a governor, a device for modifying the effects of inertia and other disturbing forces, and means whereby the device may be adjusted by varying the resistance of an electric current, substantially as set forth.

16. The combination, with a fluid-pressure motor, of a governor, a device for modifying the effects of inertia and other disturbing forces, and means whereby the device may be automatically adjusted, substantially as set forth.

17. The combination, with a fluid-pressure motor, of a governor, and a device for modifying the effects of inertia and other disturbing forces, which is adjustable automatically and by hand, substantially as set forth.

18. In a multiple system of motor-driven electric generators, the combination with a speed-controller of means for applying thereto the differential effects of electric currents before and after discharge into a common circuit or connected system, substantially as set forth.

19. In a fluid-pressure motor, the combination, of a centrifugally-acting weight, a distribution-valve, with an adjustable eccentric connected to the weight and forming the means of connection with the distribution-valve, a cylinder, containing a piston connected to the distribution-valve and adapted to alternately compress and expand elastic fluid therein, and means whereby the character of the compression and expansion may be automatically controlled, substantially as set forth.

20. In a fluid-pressure motor, the combination, with a centrifugally-acting weight and a distribution-valve, of an eccentric adapted to be adjusted by the weight and forming the means of connection between the weight and the distribution-valve, and a pressure device connected to the reciprocating parts of the valve-gear and adapted by adjustment to modify the governing forces and vary the speed as desired through the application of electric currents.

21. In a fluid-pressure motor, the combination, of a centrifugally-acting weight and a distribution-valve, with a modifying speeding attachment under control of opposing influences of current from the generator to a common conductor or distributer and from the common conductor to the main feeder, substantially as set forth.

22. In a fluid-pressure motor, the combination, with a centrifugally-acting weight and a distribution-valve, of a pressure device subject to the modifying influence of an electric balance for the division of load between two or more units of power and independent adjustable modifying means whereby the speed may be controlled, substantially as set forth.

In testimony whereof I have hereunto set my hand.

FRANCIS M. RITES.

Witnesses:
WM. W. FORD,
A. C. ROBERTSON.